June 5, 1951
E. M. CALLENDER
2,556,065
ELECTRIC CONTROL SYSTEM FOR HEATING OF ENCLOSURES
Filed Feb. 14, 1948
3 Sheets-Sheet 1
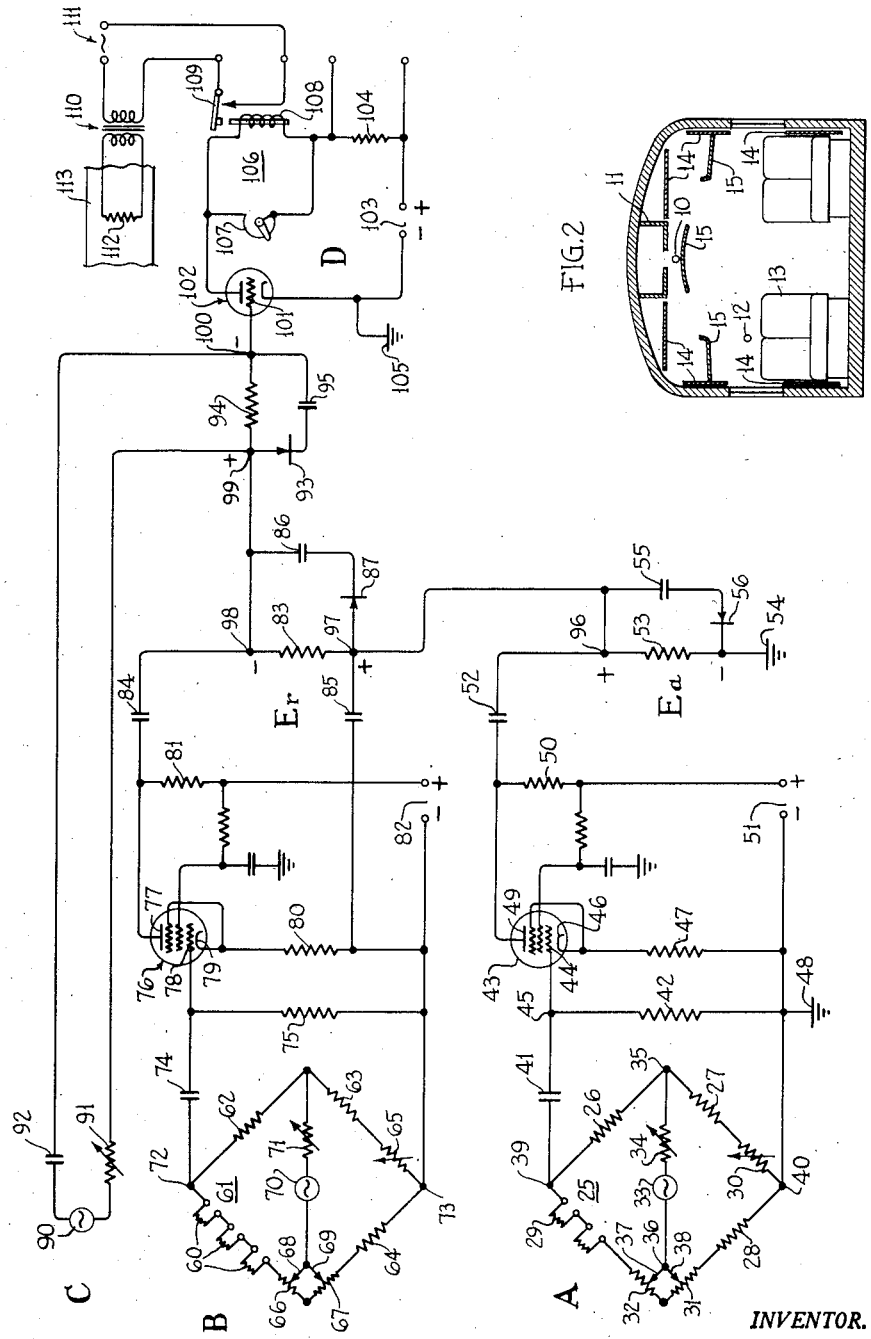

June 5, 1951 E. M. CALLENDER 2,556,065
ELECTRIC CONTROL SYSTEM FOR HEATING OF ENCLOSURES
Filed Feb. 14, 1948 3 Sheets-Sheet 2
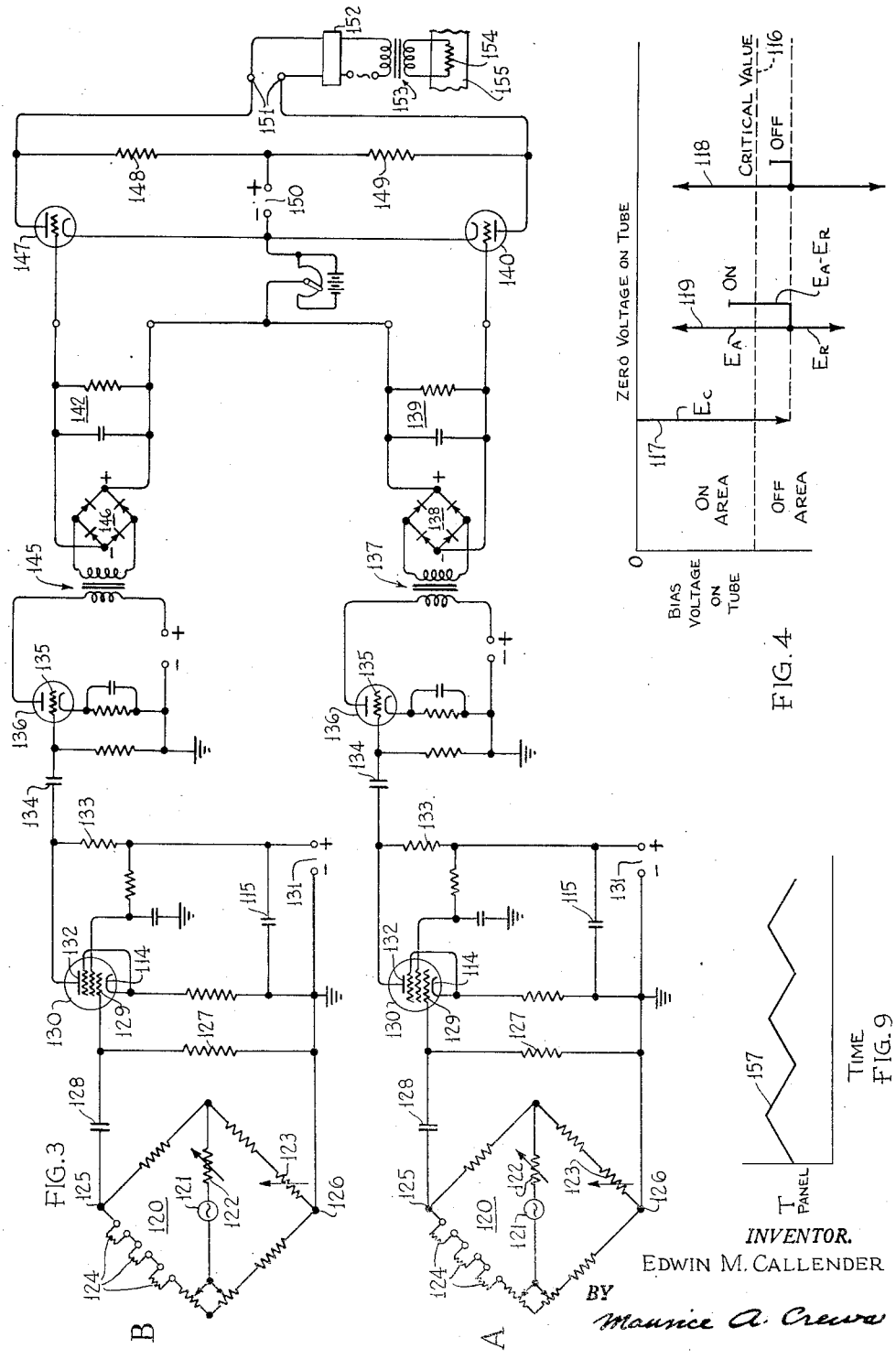
INVENTOR.
EDWIN M. CALLENDER
BY Maurice A. Crews
ATTORNEY June 5, 1951  E. M. CALLENDER  2,556,065
ELECTRIC CONTROL SYSTEM FOR HEATING OF ENCLOSURES
Filed Feb. 14, 1948  3 Sheets-Sheet 3
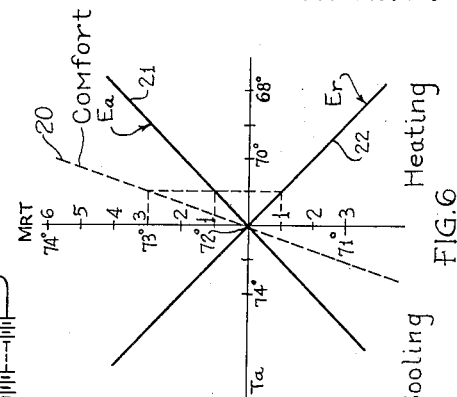
FIG.6
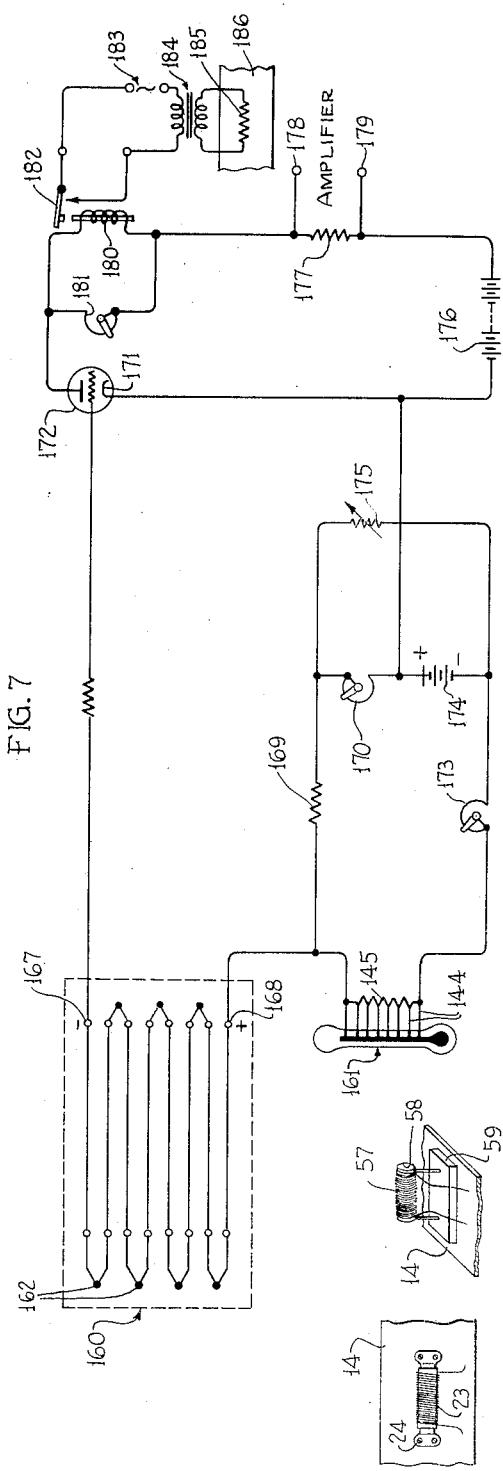
FIG.7
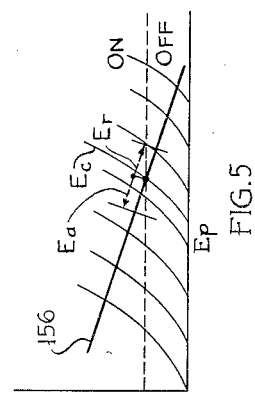
FIG.5
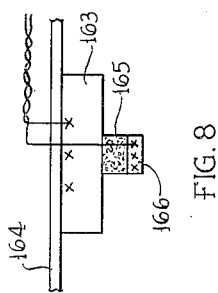
FIG.8
FIG.11
FIG.10
INVENTOR.
EDWIN M. CALLENDER
BY
Maurice A. Crews
ATTORNEY Patented June 5, 1951

2,556,065

UNITED STATES PATENT OFFICE 2,556,065

ELECTRIC CONTROL SYSTEM FOR HEATING OF ENCLOSURES

Edwin M. Callender, Cynwyd, Pa., assignor to The Budd Company, Philadelphia, Pa., a corporation of Pennsylvania Application February 14, 1948, Serial No. 8,443

3 Claims. (Cl. 219—20)

This invention relates to a heat control system for rooms, railway cars and similar enclosures in which the control is dependent upon the space temperature of the enclosed air and an integration of the radiant heat derived from the walls of the enclosure and received at a point at which the desired temperature conditions are to be maintained, the temperature values of both air space and radiation being translated into voltages for effective control action.

In room heating it has been experimentally determined that a condition for comfort exists (humidity and other known comfort factors being satisfactory) when the sum of the average air temperature of the enclosure and the integrated mean radiant temperature is a constant. In other words, as the air temperature inside the room increases in value, the radiation from radiant heating means within the enclosure decreases; or where the temperature of the air space decreases, the radiation temperature increases; so that in all conditions of variation of enclosure air temperature and radiation temperature, the sums of these values form a constant. For example, for comfort conditions within the usual range, the total of air and radiant black-body temperatures may add to the sum of 144, and in the specific example taken, the air and radiant temperatures are made equal at 72° F.

One of the primary objects of the present invention is to provide a heat control system which may be applied effectively to the maintenance of the balanced condition for comfort of an occupant of an enclosure as mentioned above.

An object of the invention also is to provide efficient means for expressing air and radiation temperatures as voltages in order to permit ready application to control mechanism.

An important object of the invention is to provide apparatus and circuits permitting integration of heat radiation from a plurality of spaced points or areas within an enclosure or at the walls thereof.

An object also is to provide improved means for obtaining the mean radiant temperature at a point within an enclosure.

Additional objects may be indicated as follows: to provide a system involving all-electric detection and application of heat values derived from the air space and heat radiation of an enclosure; to provide a heat control system in which there is substantially complete elimination of time lag in the control function; to provide a control arrangement which permits ready installation in varied types of room interiors; to provide a heat control which lends itself to accurate and easy adjustment for varied conditions of placement and use; to provide a heat control which may be easily associated with electronic amplifying devices; and to provide an electric heat control system characterized by pronounced sensitivity, stability and selectivity.

Preferred means by which the above objects are accomplished are described hereinbelow and illustrated in the accompanying drawings, in which:

Figure 1 is a wiring diagram of the control circuit;

Figure 2 is a vertical cross section through a railway 20 car to which the invention may be applied;

Figure 3 is a wiring diagram of a slightly modified form of control circuit;

Figure 4 is a view illustrating the voltage sum effect of the various heat factors on the power apparatus as determined by the critical voltage value on the power tube;

Figure 5 is a diagram showing the load curve of the power tube under conditions where the tube is grid biased at the critical relay operating value for a given example;

Figure 6 is a diagram of curves illustrating the linear relationship between the mean radiant temperature values for different values of air space temperature for a specific selected condition, and also values of control voltage variation corresponding to variation in air space temperature and air space mean radiant temperature;

Figure 7 is a wiring diagram of a second modification of the control circuit;

Figure 8 is a detail of the thermocouple connection in the enclosure of Fig. 7;

Figure 9 is a diagram of the control panel temperatures with time for illustrative outside temperature conditions;

Figure 10 is a detail of the panel bridge resistor; and

Figure 11 is a detail of the air space bridge resistor.

For any static temperture condition, air space temperature within an enclosure may be readily determined by an indicator, such as a thermometer, applied at a point within the walls of the enclosure subject to free contact with the enclosed air. Such a point is indicated at 10 in Fig. 2 at the mouth of an inflow air duct 11 for air flowing into the enclosure 9. Also, the point 12 may be selected adjacent car seats 13 at which temperature conditions for comfort are to be maintained. The point 12 receives radiant heat from miscellaneous scattered panels 14 fixed in the wall and at other strategic points 15 inside the enclosure. Sections also of the enclosure wall are unheated so that the point 12 receives radiant heat of widely varying values which in aggregate establishes the radiant or black body temperature at the point 12. Utilizing appropriate means, such as a black body indicator, the sum effect of radiant heat derived from the entire room interior may be obtained at the point 12 for any given value of the air space temperature as indicated by the thermometer at 10. Obviously, if the air temperature is varied and the mean radiant heat is simultaneously varied to maintain the desired and predetermined condition of comfort for the heat occupant, a curve, such as shown in Fig. 6, is obtained. In this figure the abscissa measures air space temperature T$a$. To ordinate measures mean radiant temperature (MRT), both abscissa and ordinate being in degrees Fahrenheit. The broken line 20 represents a comfort condition, here a special condition for purposes of illustration where at 72° the air space temperature and the mean radiant temperature are the same. With a decrease in air space temperature, there is a rectilinear increase in MRT temperature to maintain a constant relationship between these temperature values and thus to maintain the condition of comfort at the point 12. For the specific static condition, as exemplified by the comfort line 20 in Fig. 6, air temperatures and radiation temperatures in terms of voltages may be ascertained, as will be hereinafter described in detail, and these values, designated by the E$r$ curve 21 and the E$r$ curve 22 representing voltages for air space and radiant heat temperatures respectively, may be plotted as indicated in Fig. 6 for varying values of space temperature. It thus appears for the specified conditions for a given value of air space temperatube, as 71°, a corresponding MRT value of 73° is determined, as well as the air space voltage E$a$ and the radiation voltage E$r$. For the assumed conditions E$a$ equals E$r$ at a condition of comfort, and, consequently, these curves make identical angles with the zero line.

A circuit effective to translate air space and means radiant temperature values into voltages is shown in Fig. 1 of the drawing. Four interconnected networks are shown designated by the letters A, B, C and D. The A network is arranged to develop a voltage E$a$ variable with air space temperature. The B network is constructed to develop a voltage variable with mean radiation temperature at a given point of consideration inside the enclosure. The C network is designed to develop a constant voltage for giving an operating setting and control and also proper bias to the grid of the amplifying thermionic tube. The D network comprises the thermionic tube of the amplifying circuit, together with the associated power mechanism, such as a relay, for energizing the heating circuit or any other voltage energized electronic circuit of a continuously controllable type.

More closely considered, the A network for air space temperature determination inside the enclosure comprises a four-arm bridge circuit 25, having fixed resistors in three of the arms, designated by numerals 26, 27 and 28, and in the fourth arm specially devised resistors 29 adapted for placement at the point of temperature determination in the enclosure, as indicated by the point 10 of Fig. 2. The bridge temperature resistor may be in the form as shown in Fig. 11, in which the resistance wire 57 is wound on an out-bracketed insulator tube 58 mounted on a base 59 secured to the inside of the enclosure wall. In addition to the mentioned resistors, variable resistor 30 is included in series with fixed resistor 27 and potentiometer resistors 31 and 32 are connected in series respectively, with resistors 28 and 29. The input of the bridge is derived from an oscillator 33, developing a frequency at values between 25 to 3,000 cycles per second. This oscillator is connected in series through a variable adjusting resistor 34 to input points of the bridge, numbered 35 and 36. Point 36 of the oscillator circuit is provided with slidable contacts, contact 37 slidably engaging resistor 32, and slider 38 engaging resistor 31. By this means and with the aid of variable resistor 30, the power input of the oscillator is modified and the resistance of the various arms of the bridge is adjusted to a predetermined condition of balance.

The output of the bridge is from points 39 and 40 in a circuit including the capacitor 41 and grid resistor 42. The bridge output also includes a pentode tube 43 having a control grid 44 connected to point 45 intermediate the resistor 42 and the capacitor 41 of the bridge circuit. The cathode 46 is connected through a biasing resistor 47 to ground 48. The anode 49 of the tube is connected through a load resistor 50 to the positive terminal of the source 51 of tube voltage. Resistors 42, 47 and point 40 of the bridge are connected to the negative terminal of the source 51. The cathode and suppresser grid of the tube are connected together, as shown, in the conventional manner.

In order to obtain the desired air space voltage E$a$, a circuit is established from the anode 49 of tube 43 through a capacitor 52 and voltage resistor 53 to ground 54. A capacitor 55 and half-wave rectifier 56 are connected in series across the voltage resistor 53. The voltage established by resistor 53 constitutes the air space voltage desired and is designated E$a$.

In order to utilize voltage E$a$ as a measurement of air space temperature, a zero voltage condition is first established through manipulation of the variable resistors and potentiometers 30, 31, 32 and 34 in the bridge circuit. The special resistors 29 are made of material developing a rectilinear change in resistance with change in temperature so that given the initial zero point setting of the bridge, any deviation from the temperature value at which the bridge is balanced will produce an unbalance, measured in voltage change, which is amplified by the tube 43 and impressed as a voltage drop across the resistor 53 in a direction as indicated.

The B network for developing a voltage variable with mean radiant temperature is similar to the A network except in the omission of the grounds 48 and 54. These resistors may be in the form of copper winding 23 about an insulation plate 24 and the plate may be secured directly to the panel surface 14, as shown in Fig. 10.

The resistance of the resistor elements or the number of resistors at a given panel area is dependent upon the shape, heat radiating characteristics, relative surface temperature, and distance of the panel from the point of comfort, the aim being to secure a uniform temperature value at all sides of the selected comfort point. For purposes of part idnetification, the B network includes the bridge 61 which comprises the fixed resistors 62, 63 and 64, the variable resistor 65 in series with resistor 63, the potentiometer resistors 66 and 67, the potentiometer slides 68, and 69, the input oscillator 70, and the variable resistor 71 in the oscillator circuit, and special panel resistor 60. The output circuit of the bridge from points 72 and 73 of the bridge includes the capacitor 74, grid resistor 75, pentode tube 76 including the anode 77, control grid 78 and cathode 79, resistor 80, load resistor 81, anode potential source 82 and voltage resistor 83 giving the Er value connected to the anode circuit of tube 76 through capacitors 84 and 85. A capacitor 86 and half-wave rectifier are connected in series around the resistor 83.

The C circuit for establishing a voltage Ec as a negative bias on the amplifying tube is provided with a source 90. This voltage source is also an oscillator of the type of oscillators 33 and 70 and feeds voltage through a variable resistor 91, a capacitor 92, rectifier 93 and a parallel connected unit including resistor 94 and capacitor 95, resistor 94 serving as a voltage resistor for the rectified current to develop voltage Ec.

In order to combine these voltages Ea, Er and Ec, the positive point 96 of voltage Ea is connected to the positive point 97 of voltage Er, and the negative point 98 of voltage Er is connected to the positive point 99 of voltage Ec. Also, the negative point 100 of resistor 94 constituting voltage Ec is connected to the grid 101 of a vacuum triode tube 102 serving as an amplifier of the voltage sum of Ea, Er and Ec. Since Ea and Er are opposed to each other, only the differential of these two voltages will be impressed on the voltage Ec and function as a variable control of current passing through tube 103. There is thus obtained in the differential of Ea and Er, a measure of the variation in temperature between the mean radiant temperature and the air space temperature of the enclosure. Amplification of this voltage difference is obtained through the tube 102 in the D circuit, this circuit including the voltage source 103, the output resistor 104, a ground connection at 105 and the relay unit 160 consisting of the variable resistor 107 and relay coil 108 connected in parallel. The relay coil is adapted to close switch 109 upon adequate energization as adjusted by the variable resistor 107 of the relay unit. Closure of switch 109 energizes the power transformer 110 through connection of power source 111 whereby the panel heater coils 112 are supplied with current to heat the panel 113. Herein, no control of air temperature is contemplated, that being controlled by other means in known manner and being kept as near constant as possible for any given comfort condition.

Reference is made to Fig. 4 as illustrating the relation between the Ec, Ea and Er voltages and the critical tube bias value for operation of power relay 108. The broken line 116, bearing legend "Critical Value," denotes the voltage bias for relay operation. For a negative bias of Ec, as shown at 117, greater than the critical value, the relay is deenergized provided the differential voltage Ea—Er produces in sum with Ec a value more negative than the critical value. This is indicated by line diagram 118. If the differential reduces the bias into the "on" area, the relay is energized as indicated at 119.

Fig. 5 illustrates the means of relating the Ep—Ip characteristics of amplifying tube 102 to the critical operating voltage of relay 180. In this figure the load line 156 is constructed in the usual manner and Ec selected as desired. For the particular case selected Ec intersects the load line at the current value of relay operation. Since Ea and Er are equal at the comfort point (Fig. 6), this condition exists until either Ea or Er changes in value. An increase in Er over Ea will continue the off heat condition; an increase in Ea over Er will turn on the heat.

It thus appears that for any given setting of Ec and for the selected values of Ea and Er, variation from a condition of comfort at point 12 within the enclosure, as evidenced in changes in Ea and Er, will produce a modulation of temperature values following the pattern of the curves of Fig. 9. In this figure curve 157 indicates temperature variation with time for successive on and off application of the heat supply. The frequency of gradient change will vary with periods of inside air temperature change as influenced, for example, by the temperature outside the enclosure.

In Fig. 3 a modified circuit of the control system is illustrated in which a push-pull amplifier unit is used. Since the A and B networks of this circuit are identical, only the A network will be described in detail. This network includes the bridge 120, identical in all respects to the A bridge of Fig. 1, including the oscillator source 121, the variable resistors 122 and 123, the potentiometer resistors, the various fixed resistors and the thermal resistors 124. The output points 125 and 126 of the bridge are connected through the grid resistor 127 to the capacitor 128. Point 126 is grounded. Point 125 is also connected to the control grid 129 of the pentode 130. The constant potential source 131 is applied to the anode 132 and cathode 114 of pentode 130 through the load resistor 133. A capacitor 115 is also connected across source 131. The negative terminal of resistor 133 is connected through the capacitor 134 to the grid 135 of the amplifying tube 136. An amplifying transformer 137 is connected to the load circuit of the tube 136, the output of which is passed through the full-wave rectifier 138 and filter unit 139 to the grid and cathode of amplifying tube 140. A constant potential biasing voltage 141 is connected in the conductor between the cathode and the filter 139.

The identical B section of the circuit includes also an amplifying transformer 145 and a rectifier 146 receiving fluctuating current from transformer 145. The rectifier is connected also to the grid and cathode of amplifying tube 147, the battery 141 being in the cathode circuit between the cathode and the filter unit 142, also included in the circuit. Anodes of tubes 140 and 147 are connected through resistors 148 and 149 to the source of anode potential 150. These anodes are also connected to the output terminals 151 from which connection is made through a control unit 152 of any desired construction and A. C. source to the primary of the power transformer 153. Heating current from the secondary of transformer 153 is utilized in the heating coil 154 of panel 155.

An additional modification of the circuit of the control system is shown in Fig. 7. In this modification instead of bridge circuits with heat sensitive resistors in one arm of the bridge to produce a condition of unbalance and thereby operate the power control of the heating circuit, use is made of a group of thermostats 160 for developing the mean radiant temperature. A thermostat 161 is employed for securing the air space temperature. The figure shows a series of individual thermocouples 162, which are placed in the walls of the enclosure at various spaced points so as to obtain a proper summing of the temperature condition over the entire wall area. Fig. 8 illustrates a mode of connection to the wall, the heated juncture of the thermocouple being placed in the wall 163 adjacent the panel 164 from which radiation to the room interior takes place. Insulation 165 separates the cold junction of the thermocouple embedded in the outer lining 166 of the wall from the heated junction at the panel. These various thermocouples are connected in series, so as to add the respective voltages, and to the output terminals 167 and 168.

Terminal 168 of the thermocouple bank is connected to the thermostat 161 and through fixed resistor 169 and variable resistor 170 to the cathode 171 of the triode vacuum amplifying tube 172. The thermostat may be of any desired construction but is here shown as a mercury type thermometer with a series of resistor taps 144 secured through the wall of the thermometer to contact with the moving column of mercury. The taps are connected to a resistor 143 so that movement of the mercury varies the resistance of the thermostat. The thermostat, in addition to connection to the positive terminal 168 of the thermocouple bank, has connection through a variable resistor 173 and constant potential source 174 to the cathode 171 of tube 172. Variable resistor 175 is connected in shunt above the potential source 174 and the variable resistor 170 as shown. Plate potential for the amplifying tube 172 is supplied by the battery 176. The load circuit of this tube includes the voltage resistor 177, having outlet terminals 178 and 179 and a relay-resistor unit 180, 181. Normally open relay switch 182, when closed, passes a current from the alternating current source 183 to the power transformer 184, thus supplying heating current to the resistor 185 within the panel 186 of the enclosure.

In reviewing the circuit of Fig. 7, it will appear that the circuit, including the battery 174 and variable resistors 170 and 175, establishes the Ec potential across the variable resistor 170. This resistor is also adapted to receive current from the circuit including the air space temperature thermostat 161 and variable resistor 173, the voltage drop across resistor 170 of the air space temperature circuit being in the same direction as that of Ec and the voltage across resistor 170 developed thereby constituting the air space voltage Ea. The voltage developed by the bank of thermocouples 160, variable with heat radiation within the enclosure, is also effective across the common resistor 170 but in a direction opposite to the Ec and Ea voltages so that it now appears that as in the other forms of the circuit a differential of Er and Ea is subjected to the biasing of a constant voltage Ec so as to obtain the proper operating characteristics for amplification in the tube 172. Also, by appropriate adjustment of the variable resistors 173 and 175, the adjustment to the critical operating value of the relay 180 in the output circuit is secured so that the relay switch operates only upon conditions of differential voltages as between the radiation and air space temperatures which will secure the desired heating effects for the enclosure.

In Fig. 6 of the drawing, curves Ea and Er are shown as straight lines but these lines under various temperature and circuit conditions may be curved. The straight line effect is based on the use of a limited range of low temperatures where the radiant heat flux variation is approximately a first power of the temperature change, i. e. radiant emissivity $= K(T_1 - T_0)^{1.03t}$ where K is a constant, T is temperature and $t$ is time. Accordingly $\Delta Er$ varies as $\Delta T$. Linear functions may also be established for Ea and Ec.

The use of variation in degree panel heating about the enclosure is an important feature of the invention in that uniformity in heat radiation at the point of comfort may be obtained. In accordance with known heat laws, the greater the distance of the panel from the comfort point, the greater the panel heat supply necessary to furnish a given radiant heat value at the point, thus giving each panel a weighted effect.

The various circuits of the system are exemplary and not restricted since modifications may be made coming within the scope of the claims as appended.

What is claimed is:

1. In a control system for electric heating of enclosures including radiant heating elements and air heating elements effective at a control zone within the enclosure, comprising a first group of electrical resistance elements placed at spaced intervals at the radiant heating elements of the enclosure and weighted for the effective radiation produced at the control zone from each such radiant heating element, said resistance elements being formed of a material having a resistance variable with temperature, an electrical circuit network for integrating voltage derived from said resistance elements to secure a first voltage proportional to the radiant temperature effective at the control zone within the enclosure, a second group of electrical resistance elements placed within said enclosure to measure air temperature adjacent said control zone, a second electrical circuit network for integrating voltages derived from said second group of resistance elements in a second opposed voltage inversely proportionl to the air temperature effective at the control zone, a biasing voltage electrical circuit network including means for combining said first, second and biasing voltages to produce a single control voltage, and means for translating said control voltage into power actuating mechanism control for modifying the radiant heating effects with changes in air temperature.

2. In a control system for electrical heating of enclosures including radiant heating elements and air heating elements effective at a control zone within the enclosure, a first group of electrical resistance elements placed at spaced intervals at the radiant heating elements of the enclosure and weighted for the effective radiation produced at the control zone from each such radiant heating element, said resistance elements being formed of a material having a resistance variable with temperature, an electrical circuit network for integrating voltages derived from said elements to secure a first voltage proportional to radiant temperature effective at the control zone within the enclosure, a second group of electrical resistance elements placed within said enclosure to measure air temperature adjacent said control zone, a second electrical circuit network for integrating voltages derived from said second group of resistance elements in a second opposed voltage inversely proportional to the air temperature effective at the control zone, a biasing voltage electrical circuit network including means for combining said first, second and biasing voltages to produce a single control voltage, and means for translating said control voltage into power actuated mechanism control for modifying the radiant heating effects with changes in air temperature, said combining voltage means comprising a four-arm bridge having input and output terminals, a grid-controlled tube in each of two adjacent arms, a rectifier between the grid of each tube and one of said first and second voltage networks, a unidirectional voltage element between the cathodes and grids of said tube, and connecting conductors between said bridge, tubes, rectifiers and voltage elements.

3. An electrical heating system for providing regulated heat values at a control zone within the enclosure, comprising a source of radiant heating power, a heat exchanger adapted to receive power from said source and to supply radiant heat, switch mechanism between the power source and exchanger, and control means for adjusting the supply of power to said heat exchanger, said control means including a first circuit having an element sensitive to heat radiation for establishing a radiant heat voltage proportional to black-body radiant heat temperatures at the control zone, a second circuit having an element sensitive to air temperature for establishing an opposed air temperature voltage inversely proportional to air temperatures at said control zone, a third circuit for establishing a unidirectional biasing voltage, power sources for each of said circuits, circuit means for algebraically adding said voltages to secure a single control voltage, and power means operatively related to said single control voltage circuit means for actuating said switch mechanism, said first circuit comprising a plurality of heat responsive voltage controlling elements placed at spaced points along the walls of said enclosure and weighted for the effective radiation produced at the control zone from each such radiant heating element, and series connections between said elements in an electrical circuit to provide a means or summation effect at said control zone.

EDWIN M. CALLENDER.

REFERENCES CITED

The following references are of record in the file of this patent:

UNITED STATES PATENTS

| Number | Name | Date |
| --- | --- | --- |
| 1,893,847 | Simpson | Jan. 10, 1933 |
| 2,086,966 | Shrader | July 13, 1937 |
| 2,217,797 | Donovan | Oct. 15, 1940 |
| 2,236,624 | Littwin | Apr. 1, 1941 |
| 2,272,492 | Weyher | Feb. 10, 1942 |
| 2,273,734 | Pearce | Feb. 17, 1942 |
| 2,375,988 | Gille et al. | May 15, 1945 |
| 2,382,340 | Smith | Aug. 14, 1945 |
| 2,423,541 | Wilson et al. | July 8, 1947 |